United States Patent
Schreurs et al.

(10) Patent No.: US 10,635,176 B2
(45) Date of Patent: Apr. 28, 2020

(54) ELECTRONIC DEVICE

(71) Applicant: Innolux Corporation, Miao-Li County (TW)

(72) Inventors: Jozef Egidius Maria Schreurs, Miao-Li County (TW); Jef Notermans, Miao-Li County (TW); Gerben Johan Hekstra, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/027,581

(22) Filed: Jul. 5, 2018

(65) Prior Publication Data

US 2019/0187796 A1    Jun. 20, 2019

Related U.S. Application Data

(63) Continuation-in-part of application No. 15/844,862, filed on Dec. 18, 2017, now Pat. No. 10,521,016.

(51) Int. Cl.
*G06F 3/01* (2006.01)
*G06F 3/041* (2006.01)
*G06F 1/16* (2006.01)

(52) U.S. Cl.
CPC ............ *G06F 3/016* (2013.01); *G06F 1/1643* (2013.01); *G06F 3/041* (2013.01); *G06F 2203/04103* (2013.01); *G06F 2203/04105* (2013.01)

(58) Field of Classification Search
CPC ......... G06F 1/1643; G06F 2203/04103; G06F 2203/04105; G06F 3/016; G06F 3/041
See application file for complete search history.

(56) References Cited

U.S. PATENT DOCUMENTS

| 2007/0080951 A1* | 4/2007 | Maruyama ............ G06F 1/1626 345/173 |
| 2009/0001855 A1 | 1/2009 | Lipton et al. |
| 2012/0139851 A1 | 6/2012 | Kim et al. |
| 2013/0342484 A1 | 12/2013 | Bae et al. |
| 2018/0059794 A1 | 3/2018 | Nakamura et al. |
| 2018/0081483 A1* | 3/2018 | Camp ................. G06F 3/03547 |
| 2019/0187793 A1* | 6/2019 | Schreurs ................. G06F 3/016 |

FOREIGN PATENT DOCUMENTS

KR    20120006729 A    1/2012

OTHER PUBLICATIONS

EPO Search Report dated Apr. 18, 2019 in EP application (No. 18208014.3-1216).
Non-Final Office Action issued in U.S. Appl. No. 15/844,862, filed Dec. 18, 2017, dated May 15, 2019.

* cited by examiner

*Primary Examiner* — Afroza Chowdhury
(74) *Attorney, Agent, or Firm* — McClure, Qualey & Rodack, LLP

(57) ABSTRACT

An electronic device includes a touch panel, a housing, a moving element and an elastic plate. The moving element is connected to the touch panel. The elastic plate includes a first portion connected to the touch panel, a second portion connected to the moving element, and a third portion connected to the housing.

8 Claims, 14 Drawing Sheets

ELECTRONIC DEVICE

This application is a continuation-in-part application of co-pending U.S. application Ser. No. 15/844,862 filed on Dec. 18, 2017, the contents of which are incorporated herein by reference.

TECHNICAL FIELD

The disclosure relates in general to an electronic device, and more particularly to an electronic device provided with haptic feedback.

BACKGROUND

Recently, an electronic device having a display device provided therein is commonly used in our daily lives, such as a smart phone, a navigation device for vehicles, a digital camera, and a digital video camera. Such an electronic device is usually provided with haptic feedback, like vibration or other movement, which can be aware by user to enhance user's experience.

However, when haptic feedback occurs, it is possible to generate unwanted vibration or movement to the housing of electronic device that accommodates the display device, thus resulting in a potential collision between the housing and the body where the housing is joined.

SUMMARY

According to one embodiment, an electronic device is provided. The electronic device includes a touch panel, a housing, a moving element and an elastic plate. The moving element is connected to the touch panel. The elastic plate includes a first portion connected to the touch panel, a second portion connected to the moving element, and a third portion connected to the housing.

Figure 1:
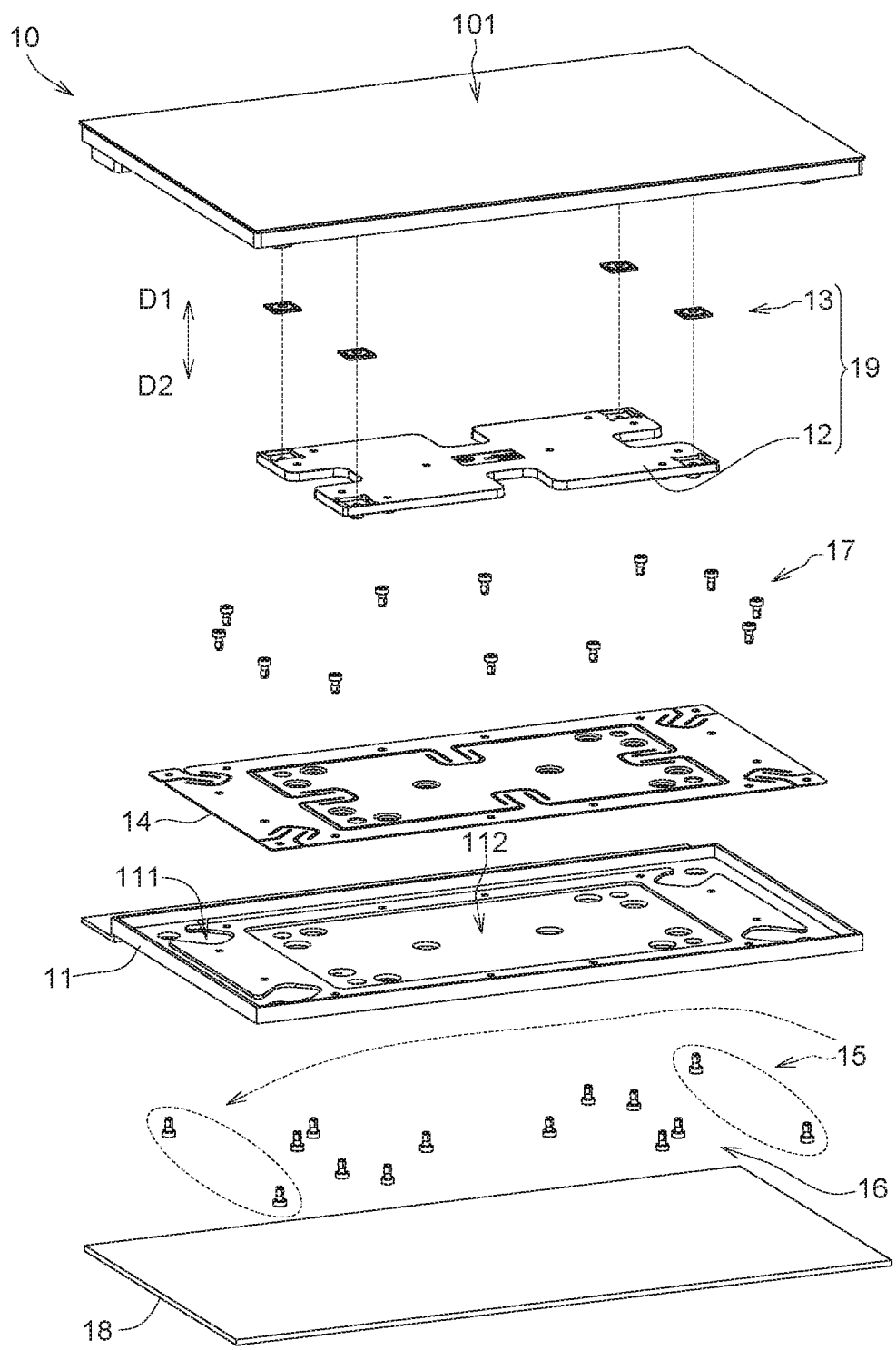
FIG. 1 shows an exploded view of an electronic device according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Detailed descriptions of the embodiments of the disclosure are disclosed below with accompanying drawings. In the accompanying diagrams, the same numeric designations indicate the same or similar components. It should be noted that accompanying drawings are simplified so as to provide clear descriptions of the embodiments of the disclosure, and the following detailed description are exemplary and explanatory only and are not restrictive of the disclosed embodiments as claimed. Anyone who is skilled in the technology field of the disclosure can make necessary modifications or variations to the structures according to the needs in actual implementations.

FIG. 1 shows an exploded view of an electronic device 1 according to an embodiment of the present disclosure. As shown in FIG. 1, the electronic device 1 includes a touch panel 10 in the front of the electronic device 1, a housing 11, a moving element 19 and an elastic plate 14. The electronic device 1 may further include a decorative component 18 in the rear of the electronic device 1. The electronic device 1 may be integrated into a smart phone, a navigation device for vehicles, a digital camera or a digital video camera via the housing 11. The touch panel 10 includes a touch surface 101 for a user's touch. In some embodiments, when a user touches the touch surface 101 of the touch panel 10 and the press force is above a predetermined value, the touch panel 10 may provide vertically dynamic vibration or movement to the user. Thus, the electronic device 1 is a haptic electronic device. In FIG. 1, the touch panel 10 is simply shown for brevity. Specifically, in some embodiments, the touch panel 10 can include a display panel (not shown) providing display function. In some embodiments, the touch panel 10 can include touch sensors separated from the display panel, integrated on the display panel, or integrated in the display panel. The display panel included in the touch panel 10 can be a liquid crystal display panel, an organic light emitting display panel, a micro (or mini) LED display panel, or a quantum dot display panel. When the touch panel 10 includes a liquid crystal display (LCD) panel, a backlight unit (not shown) can be disposed under the LCD panel to provide backlight.

In the present embodiment, the moving element 19 can move and can include a counter mass 12 and an actuator 13. A plurality of actuators can be provided. As shown in FIG. 1, four actuators 13 can be disposed on the counter mass 12, for example, on corners of the counter mass 12. The counter mass 12 may be configured to compensate or counteract vibration of the touch panel 10, such that the vibration will not be transmitted to the housing 11.

Figure 2A:
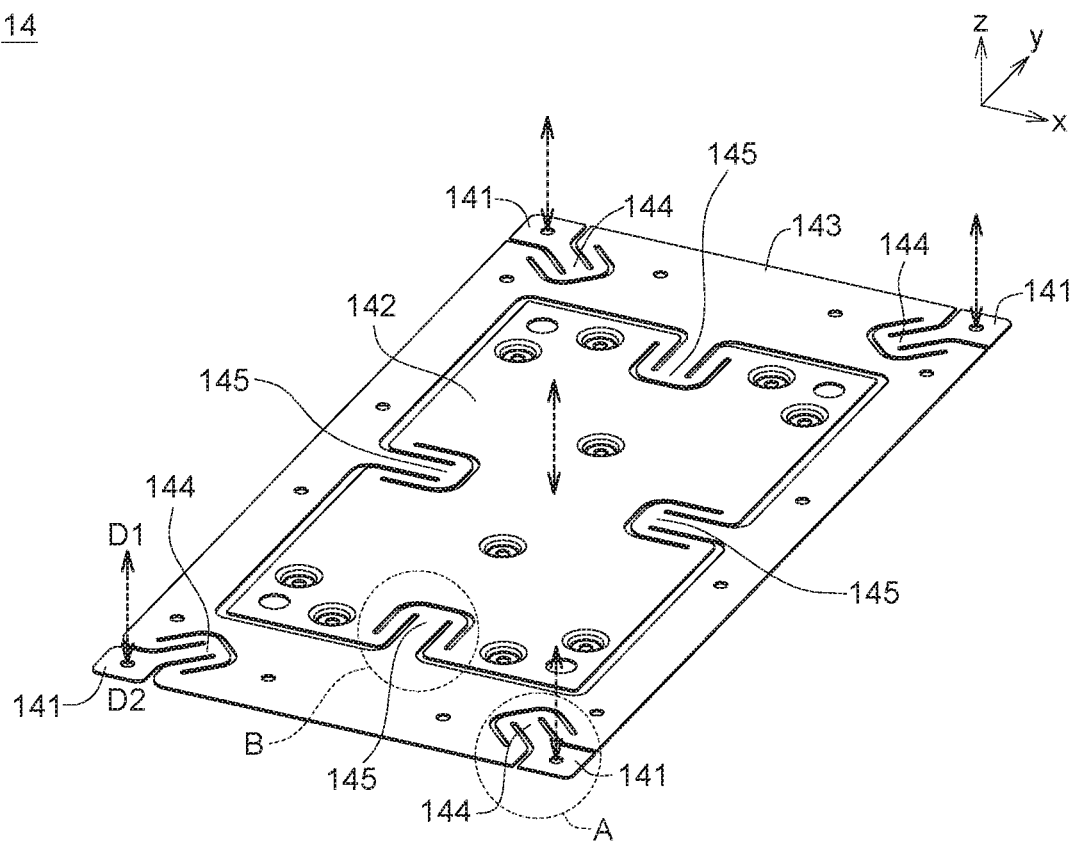
FIG. 2A shows a schematic view of an elastic plate of the electronic device of FIG. 1.

FIG. 2A shows a schematic view of the elastic plate 14 of the electronic device 1 of FIG. 1. As shown in FIG. 2A, the elastic plate 14 may include a first portion 141, a second portion 142 and a third portion 143. The first portion 141 can be connected to the touch panel 10, the second portion 142 can be connected to the moving element 19, and the third portion 143 can be connected to the housing 11. In one embodiment, there may be four first portions 141 at corners of the elastic plate 14, the second portion 142 may be located at a center portion of the elastic plate 14. The third portion 143 may be located between the second portion 142 and the four first portions 141. In detail, the third portion 143 may be located in the peripheral region of the elastic plate 14. For example, the second portion 142 may be surrounded by the third portion 143. The elastic plate 14 may be symmetrical. However, the present disclosure is not limited thereto.

Figure 2B:
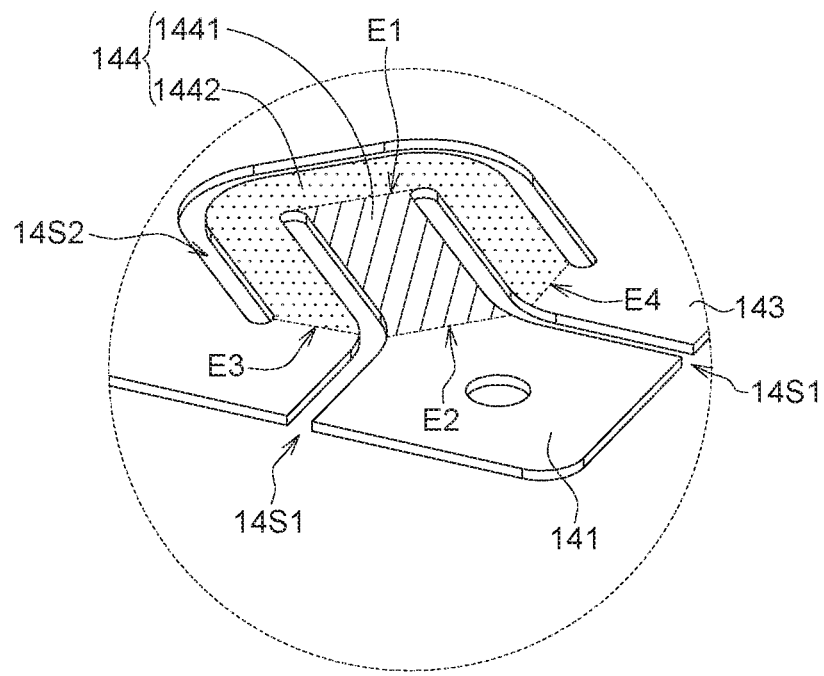
FIG. 2B shows a partially enlarged view of region A of the elastic plate of FIG. 2A.

The elastic plate 14 may further include a first elastic member 144 connected between the first portion 141 and the third portion 143, and a second elastic member 145 connected between the second portion 142 and the third portion 143. According to some embodiments, the first portion 141, the third portion 143 and the first elastic member 144 may be disposed in the same plane. According to some embodiments, the second portion 142, the third portion 143 and the second elastic member 145 may be disposed in the same plane. The first portion 141 may move relative to the third portion 143 with one degree of freedom (i.e., the movement in z-axis) via the first elastic member 144 without rotation, Specifically, as shown in FIG. 2B, the first elastic member 144 may include a first linear portion 1441 and a first U-shaped portion 1442 connected to one end E1 of the first linear portion 1441. The first elastic member 144 may be connected to the first portion 141 at the other end E2 of the first linear portion 1441. The first elastic member 144 may be connected to the third portion 143 at two ends E3 and E4 of the first U-shaped portion 1442.

Furthermore, the elastic plate 14 may have two first slots 14S1 and a first separating slot 1452. As shown in FIG. 2B, the two first slots 14S1 may separate the first portion 141 from the third portion 143, and may further separate the first linear portion 1441 from the first U-shaped portion 1442 except for the end E1. The first separating slot 14S2 may separate the first elastic member 144 from the third portion 143, and specifically, separate the first U-shaped portion 1442 from the third portion 143 except for the two ends E3 and E4. When the first portion 141 moves, the first linear portion 1441 and the first U-shaped portion 1442 may both deform, and thus the first portion 141 may move relative to the third portion 143 with one degree of freedom (i.e., the movement in z-axis) without rotation.

Figure 2C:
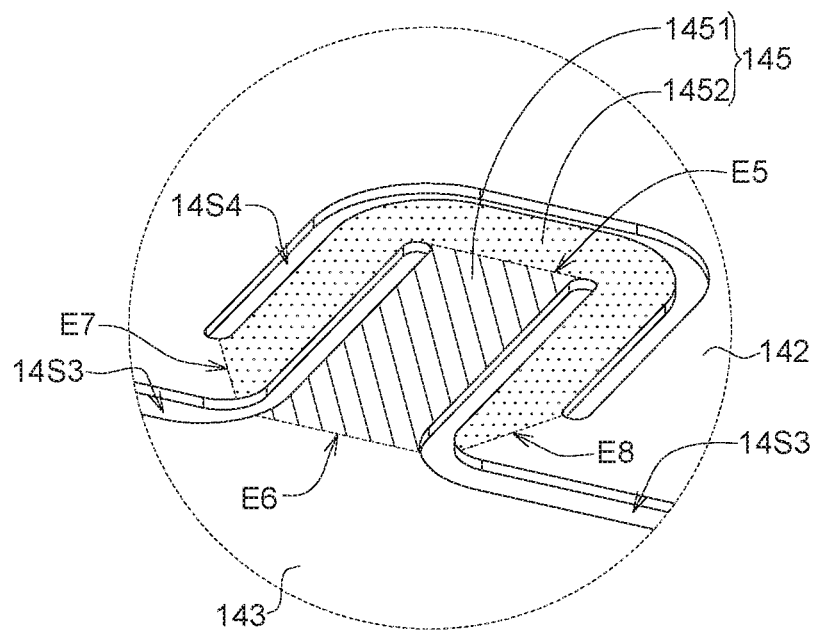
FIG. 2C shows a partially enlarged view of region B of the elastic plate of FIG. 2A.

Similarly, the second portion 142 may move relative to the third portion 143 with one degree of freedom (i.e., the movement in z-axis) via the second elastic member 145 without rotation. Specifically, as shown in FIG. 2C, the second elastic member 145 may include a second linear portion 1451 and a second U-shaped portion 1452 connected to one end E5 of the second linear portion 1451. The second elastic member 145 may be connected to the third portion 143 the other end E6 of the second linear portion 1451. The second elastic member 145 may be connected to the second portion 142 at two ends E7 and E8 of the second U-shaped portion 1452.

Furthermore, the elastic plate 14 may have two second slots 14S3 and a second separating slot 14S4. As shown in FIG. 2D, the two second slots 14S3 may separate the third portion 143 from the second portion 142, and may further separate the second linear portion 1451 from the second U-shaped portion 1452 except for the end E5. The second separating slot 14S4 may separate the second elastic member 145 from the second portion 142, and specifically, separate the second U-shaped portion 1452 from the second portion 142 except for the two ends E7 and E8. When the second portion 142 moves, the second linear portion 1451 and the second U-shaped portion 1452 may both deform, and thus the second portion 142 may move relative to the third portion 143 with one degree of freedom (i.e., the movement in z-axis) without rotation.

Here in FIG. 2A, the first elastic member 144 may include four leaf springs each for connecting one first portion 141 and the third portion 143, and the second elastic member 145 may include four leaf springs for connecting the second portion 142 and the third portion 143. However, the present disclosure is not limited thereto.

According to the above arrangement for the elastic plate 14 of FIG. 2A, the first portion 141, the second portion 142, the third portion 143, the first elastic member 144 and the second elastic member 145 are substantially coplanar (i.e., in the same plane parallel to x-y plane), thereby reducing the overall thickness of the electronic device 1. In some embodiments, the first portion 141, the second portion 142, the third portion 143, the first elastic member 144 and the second elastic member 145 may be integrally formed into the same elastic plate. In addition, the elastic plate 14 may allow one degree of freedom of vibration for the touch panel 10 and for the counter mass 12.

Referring to FIG. 1 and FIG. 2A, the first portion 141 is connected to the touch panel 10, for example, connected to the backlight unit (not shown) of the touch panel 10, by a fixing element 15. In one embodiment, the fixing element 15 may exemplarily include four screws each for joining one first portion 141 to the touch panel 10, so that the touch panel 10 is allowed to move relative to the housing 11 with one degree of freedom (i.e., in directions D1 and D2 parallel to z-axis) via the first elastic member 144. In addition, the housing 11 may have four spaces 111 each for receiving one first portion 141 and one first elastic member 144 in a condition that the first portion 141 moves in direction D2.

The second portion 142 is connected to the moving element 19. In the present embodiment, the second portion 142 may be connected to the counter mass 12 of the moving element 19 by a fixing element 16. In one embodiment, the fixing element 16 may exemplarily include a plurality of screws for joining the second portion 142 to the counter mass 12, so that the counter mass 12 is allowed to move relative to the housing 11 with one degree of freedom (i.e., in directions D1 and D2 parallel to z-axis) via the second elastic member 145, In addition, the housing 11 may have a space 112 for receiving the second portion 142 and the second elastic member 145 in a condition that the second portion 142 moves in direction D2.

The third portion 143 is connected to the housing 11 by a fixing element 17. In one embodiment, the fixing element 17 may exemplarily include a plurality of screws for joining the third portion 143 to the housing 11. In some embodiments, when vibrations of the touch panel 10 and the counter mass 12 occur, the vibrations would not be transmitted to the housing 11.

The moving element 19 is connected to the touch panel 10. In the present embodiment, the actuator 13 may be connected to the touch panel 10. As shown in FIG. 1, for example, the actuator 13 may be disposed and connected between the touch panel 10 and the counter mass 12 for moving the touch panel 10 and the counter mass 12 relative to the housing 11 in opposite directions (i.e., in directions D1 and D2), In one embodiment, the actuator 13 may be a piezoelectric actuator exemplarily including four pieces of piezoelectric actuators in contact with the touch panel 10 and the counter mass 12. In some embodiments, when the user touches the touch surface 101 of the touch panel 10, the actuator 13 can be activated. In some embodiments, the first portion 141 of the elastic plate 14 may be further configured for sensing a touch force to the touch panel 10 in directions D1 and D2, The touch force may be measured through the displacement and the stiffness of the first elastic member 144. When the touch force (press force) is over a threshold value, the actuator 13 can be activated.

Figure 3:
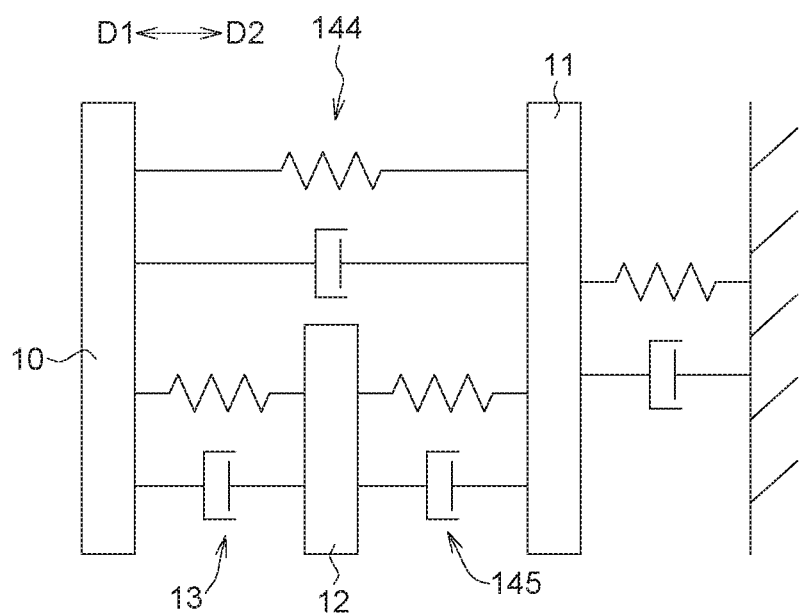
FIG. 3 schematically illustrates the electronic device of FIG. 1.

FIG. 3 schematically illustrates the electronic device 1 of FIG. 1. In FIG. 3, a mass-spring-damper system is used for describing. Referring to FIGS. 1-3, when the actuator 13 is activated, the actuator 13 exerts a mechanical force to the touch panel 10 and to the counter mass 12, such that the touch panel 10 and the counter mass 12 move in opposite directions. For example, the touch panel 10 is subjected to a force from the actuator 13 in direction D1, and the counter mass 12 is subjected to a force from the actuator 13 in direction D2; meanwhile, the first elastic member 144 and the second elastic member 145 store elastic potential energy. Once the forces applied to the touch panel 10 and to the counter mass 12 are released, the touch panel 10 starts to vibrate due to the elastic potential energy stored in the first elastic member 144, thereby generating haptic feedback to the user. The vibration or movement of the touch panel 10 is in a direction vertical to the touch surface 101, that is, in z-axis direction. Thus, the movement is called vertical haptic movement. Meanwhile, the counter mass 12 starts to vibrate as well due to the elastic potential energy stored in the second elastic member 145 so as to compensate or counteract vibration of the touch panel 10. Similarly, the vibration or movement of the counter mass 12 is in z-axis direction. That is, during one vibration period, the counter mass 12 moves in a direction (e.g., direction D1) that is opposite to the direction (e.g., direction D2) which the touch panel 10 moves in. According to some embodiments, the ratio of the weight of the touch panel 10 to the stiffness of the first elastic member 144 may be adjusted, for example, may be adjusted to be substantially equal to the ratio of the weight of the counter mass 12 to the stiffness of the second elastic member 145. Therefore, the housing 11 is free from vibration.

Figure 4:
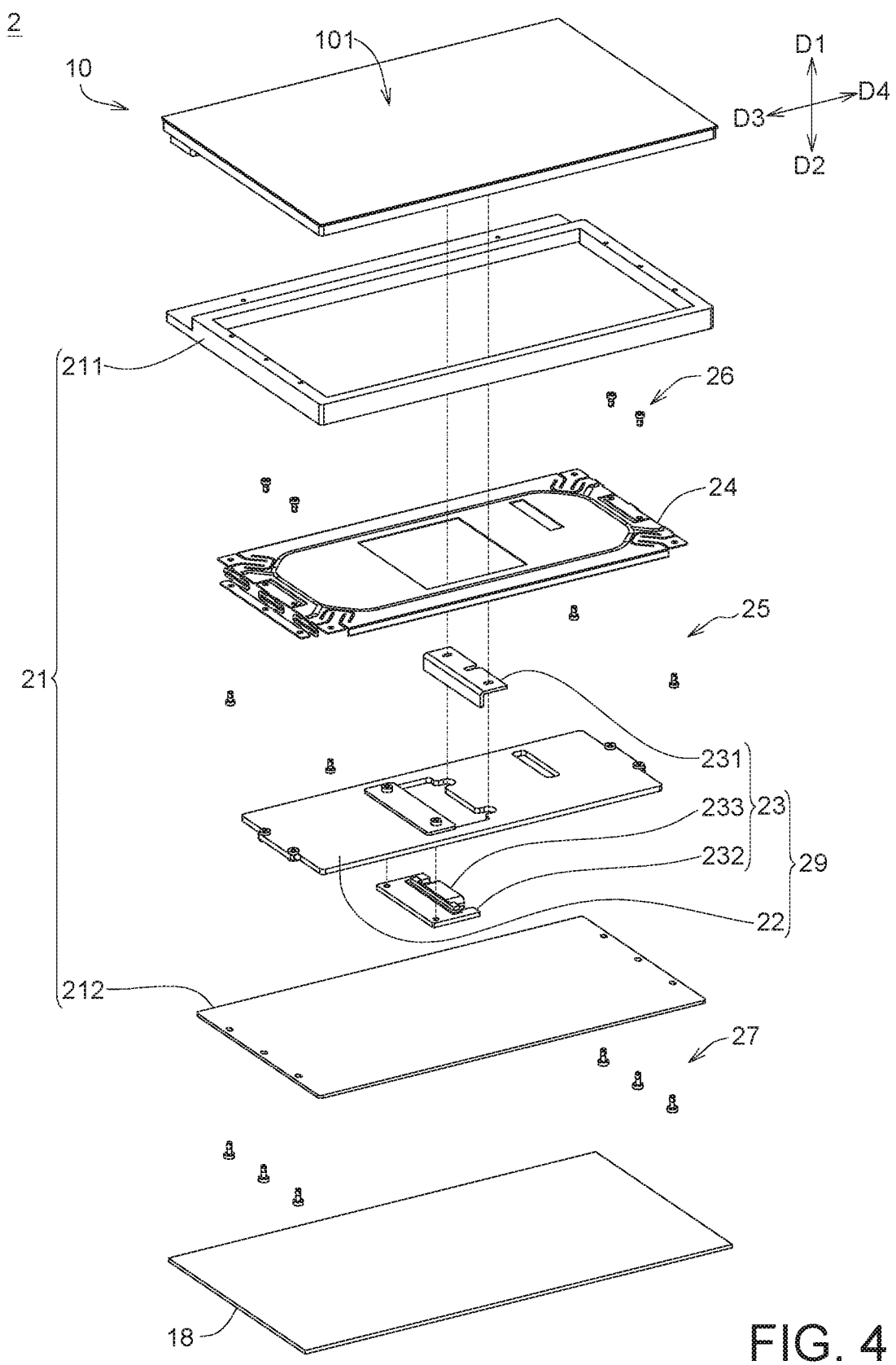
FIG. 4 shows an exploded view of an electronic device according to another embodiment of the present disclosure.

FIG. 4 shows an exploded view of an electronic device 2 according to another embodiment of the present disclosure. The elements in the present embodiment sharing similar or the same labels with those in the previous embodiment are similar or the same elements, and the description of which is omitted. The electronic device 2 as shown in the present embodiment is different from the electronic device 1 in the previous embodiment mainly in the design of the housing 21, the moving element 29 and the elastic plate 24.

The housing 21 may include an upper frame 211 and a lower plate 212. When a user touches the touch surface 101 of the touch panel 10, the touch panel 10 may provide horizontally dynamic vibration or movement to the user.

In the present embodiment, the moving element 29 can move and can include a counter mass 22 and an actuator 23. The counter mass 22 may be configured to compensate or counteract vibration of the touch panel 10, such that the vibration will not be transmitted to the housing 21.

Figure 5A:
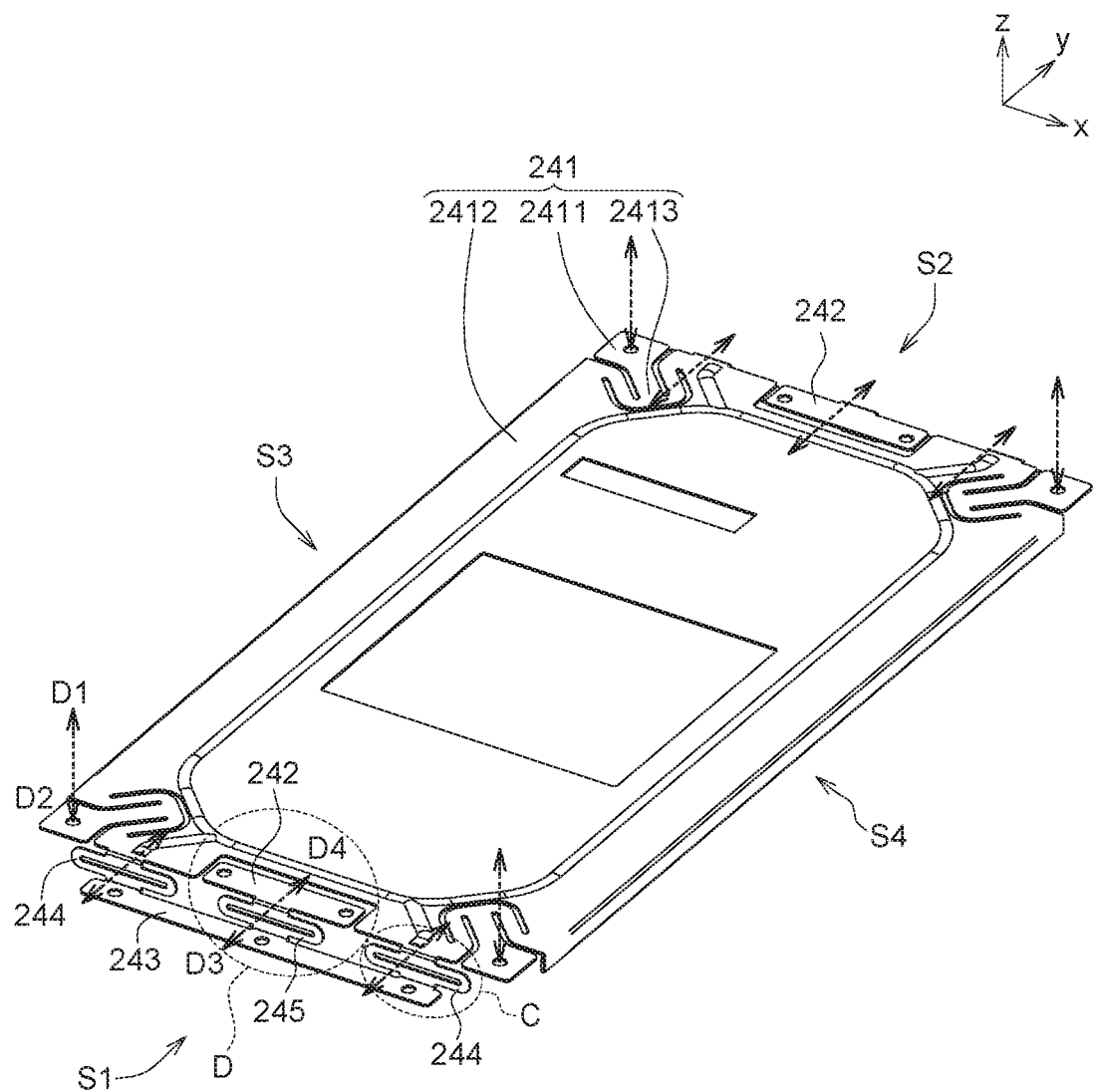
FIG. 5A shows a schematic view of an elastic plate of the electronic device of FIG. 4.

FIG. 5A shows a schematic view of the elastic plate 24 of the electronic device 2 of FIG. 4. As shown in FIG. 5A, the elastic plate 24 may include a first portion 241, a second portion 242 and a third portion 243. The first portion 241 can be connected to the touch panel 10, the second portion 242 can be connected to the moving element 29, and the third portion 243 can be connected to the housing 21. In one embodiment, there may be two second portions 242, one located on the side S1 of the elastic plate 24 and the other located on the opposite side S2 of the elastic plate 24. Furthermore, there may be two third portions 243, one located the side S1 of the elastic plate 24 and the other located on the opposite side S2 of the elastic plate 24. The elastic plate 24 can be symmetrical. For example, the two second portions 242 may respectively be located on the opposite sides S3 and S4 of the elastic plate 24, and the two third portions 243 may respectively be located on the opposite sides S3 and S4 of the elastic plate 24.

The elastic plate 24 may further include a first elastic member 244 connected between the first portion 241 and the third portion 243, and a second elastic member 245 connected between the second portion 242 and the third portion 243. According to some embodiments, the first portion 241 and the third portion 243 may be disposed in different planes. According to some embodiments, the second portion 242 and the third portion 243 may be disposed in different planes. According to some embodiments, the first portion 241 and the second portion 242 may be disposed in the same plane.

Figure 5B:
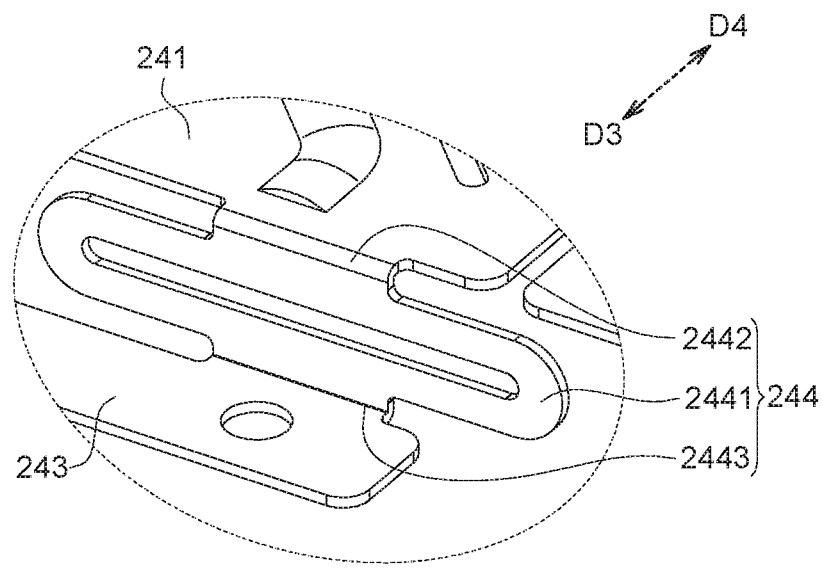
FIG. 5B shows a partially enlarged view of region C of the elastic plate of FIG. 5A.

The first portion 241 may move relative to the third portion 243 with one degree of freedom (i.e., the movement in y-axis) via the first elastic member 244. Specifically, as shown in FIG. 5B, the first elastic member 244 may include a first connecting portion 2441, a first folded portion 2442, and a second folded portion 2443. The first connecting portion 2441 is connected between the first folded portion 2442 and the second folded portion 2443. The first folded portion 2442 and the second folded portion 2443 may be respectively arranged on the upper and lower sides of the first connecting portion 2441. The first folded portion 2442 and the second folded portion 2443 may be located on different levels along a direction vertical to the touch surface 101 of touch panel 10, that is, along the z-axis direction. In other words, the first folded portion 2442 and the second folded portion 2443 are at different height levels. More in detail, the first folded portion 2442 may bend towards the first portion 241 (i.e., in direction D4) to be connected to the first portion 241, while the second folded portion 2443 may bend towards the third portion 243 (i.e., in direction D3) to be connected to the third portion 243. The first connecting portion 2441 may be disposed vertically relative to the first portion 241 and the third portion 243. That is, the first portion 241 and the third portion 243 are disposed in different planes (i.e., in different planes parallel to x-y plane).

As shown in FIG. 5A, when the first portion 241 moves, the first connecting portion 2441, the first folded portion 2442 and the second folded portion 2443 may deform, and thus the first portion 241 may move relative to the third portion 243 with one degree of freedom (i.e., the movement in y-axis). For example, if the first portion 241 moves in direction D3, the first connecting portion 2441, the first folded portion 2442 and the second folded portion 2443 may deform accordingly.

Similarly, the second portion 242 may move relative to the third portion 243 with one degree of freedom (i.e., the movement in y-axis) via the second elastic member 245.

Specifically, as shown in FIG. 5D, the second elastic member 245 may include a second connecting portion 2451, a third folded portion 2452, and a fourth folded portion 2453. The second connecting portion 2451 is connected between the third folded portion 2452 and the fourth folded portion 2453. The third folded portion 2452 and the fourth folded portion 2453 may be respectively arranged on the upper and lower sides of the second connecting portion 2451. The third folded portion 2452 and the fourth folded portion 2453 may be located on different levels along a direction vertical to the touch surface 101 of the touch panel 10, that is, along the z-axis direction. In other words, the third folded portion 2452 and the fourth folded portion 2453 are at different height level. More in detail, the third folded portion 2452 may bend towards the second portion 242 (i.e., in direction D4) to be connected to the second portion 242, while the fourth folded portion 2453 may bend towards the third portion 243 (i.e., in direction D3) to be connected to the third portion 243. The second connecting portion 2451 may be disposed vertically relative to the second portion 242 and the third portion 243. That is, the second portion 242 and the third portion 243 are disposed in different planes (i.e., in different planes parallel to x-y plane). In addition, the second portion 242 and the first portion 241 may be substantially coplanar.

Figure 5C:
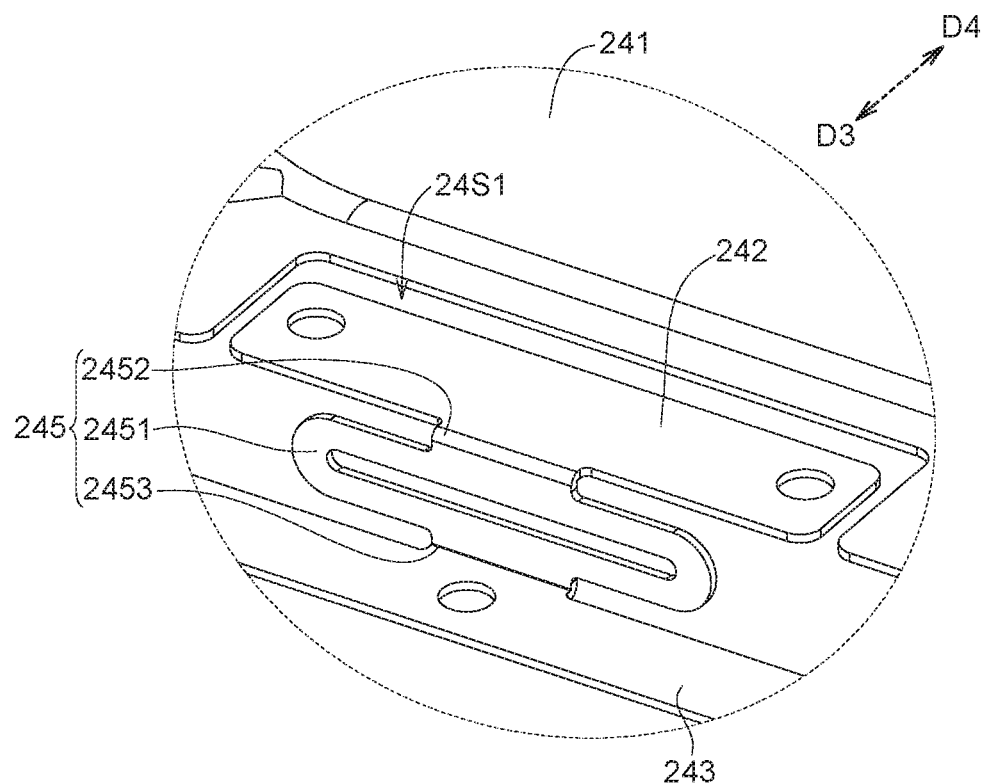
FIG. 5C shows a partially enlarged view of region D of the elastic plate of FIG. 5A.

Furthermore, the elastic plate 24 may have a third slot 2451. As shown in FIG. 5C, the third slot 24S1 may separate the second portion 242 from the first portion 241. Since the first portion 241 and the second portion 242 may move relative to the third portion 243 with one degree of freedom and they may be substantially coplanar, the third slot 24S1 may be sufficiently large to prevent collision of the first portion 241 and the second portion 242 once the first portion 241 moves in direction D3 and the second portion 242 moves in direction D4.

As shown in FIGS. 5A and 5C, when the second portion 242 moves, the second connecting portion 2451, the third folded portion 2452 and the fourth folded portion 2453 may deform, and thus the second portion 242 may move relative to the third portion 243 with one degree of freedom (i.e., the movement in y-axis). For example, if the second portion 242 moves in direction D4, the second connecting portion 2451, the third folded portion 2452 and the fourth folded portion 2453 may deform accordingly.

Here in FIG. 5A, the first elastic member 244 may include four leaf springs, two of which disposed on the side S1 of the elastic plate 24 for connecting the first portion 241 and the third portion 243 on side S1 and the other two disposed on the opposite side S2 of the elastic plate 24 for connecting the first portion 241 and the third portion 243 on side S2. Furthermore, the second elastic member 245 may include two leaf springs, one disposed on the side S1 of the elastic plate 24 for connecting the second portion 242 and the third portion 243 on side S1 and the other disposed on the opposite side S2 of the elastic plate 24 for connecting the first portion 241 and the third portion 243 on side S2. The elastic plate 24 may be symmetrical. For example, the first elastic member 244 and the second elastic member 245 may both disposed on the opposite sides S3 and S4 of the elastic plate 24.

According to the above arrangement for the elastic plate 24 of FIG. 5A, the first portion 241 and the third portion 243 may be disposed in different planes (i.e., in different planes parallel to x-y plane), and the second portion 242 and the third portion 243 may be disposed in different planes (i.e., in different planes parallel to x-y plane). In addition, the elastic plate 24 may allow one degree of freedom of vibration for the touch panel 10 and for the counter mass 22.

Referring to FIG. 4 and FIG. 5A, the first portion 241 is connected to the touch panel 10. More specifically, the first portion 241 may include a first sub-portion 2411 and a second sub-portion 2412 with a third elastic member 2413 connected between the first sub-portion 2411 and the second sub-portion 2412. The first portion 241 may be connected to the touch panel 10 via the first sub-portion 2411. The first sub-portion 2411 and the third elastic member 2413 may have similar geometry and configuration to that of the first portion 141 and the first elastic member 144 as shown in FIG. 2A and as described above, and the description of which is omitted. The first sub-portion 2411, the second sub-portion 2412 and the third elastic member 2413 may be substantially coplanar.

The first sub-portion 2411 of the first portion 241 is connected to the touch panel 10, for example, connected to the backlight unit (not shown) of the touch panel 10, by a fixing element 25. In one embodiment, the fixing element 25 may exemplarily include four screws each for joining one first sub-portion 2411 to the touch panel 10, so that the touch panel 10 is allowed to move with one degree of freedom (i.e., in directions D1 and D2 parallel to z-axis) via the third elastic member 2413.

As shown in FIG. 5A, the first portion 241 is connected to the first elastic member 244 via the second sub-portion 2412, and the first portion 241 is connected to the touch panel 10 via the first sub-portion 2411. The touch panel 10 is allowed to move relative to the housing 21 with another degree of freedom (i.e., in directions D3 and D4 parallel to y-axis) via the first elastic member 244.

The second portion 242 is connected to the moving element 29. In the present embodiment, the second portion 242 may be connected to the counter mass 22 of the moving element 29 by a fixing element 26. In one embodiment, the fixing element 26 may exemplarily include a plurality of screws for joining the second portions 242 to the counter mass 22, so that the counter mass 22 is allowed to move relative to the housing 21 with one degree of freedom (i.e., in directions D3 and D4 parallel to y-axis) via the second elastic members 245.

The third portion 243 is connected to the housing 21 by a fixing element 27. In one embodiment, the fixing element 27 may exemplarily include a plurality of screws for joining the third portions 243 to the lower plate 212 and the upper frame 211 of the housing 21. In some embodiments, when vibrations of the touch panel 10 and the counter mass 22 occur, the vibrations would not be transmitted to the housing 21.

The moving element 29 is connected to the touch panel 10. In the present embodiment, the actuator 23 may be connected to the touch panel 10. As shown in FIG. 4, the actuator 23 may be disposed and connected between the touch panel 10 and the counter mass 22 for moving the touch panel 10 and the counter mass 22 relative to the housing 11 in opposite directions (i.e., in directions D3 and D4). In one embodiment, the actuator 23 may be an electromagnetic actuator (such as a reluctance actuator) exemplarily including a first component 231 connected to the touch panel 10 for moving the touch panel 10, a second component 232 connected to the counter mass 22 for moving the counter mass 22, and a coil 233 for driving the first component 231 and the second component 232. When the user touches the touch surface 101 of the touch panel 10, the user interface receives a touch signal, and thus the actuator 23 is activated. In one embodiment, the first sub-portion 2411 of the first portion 241 of the elastic plate 24 is further configured for sensing a touch force to the touch panel 10 in directions D1 and D2. The touch force may be measured through the displacement and the stiffness of the third elastic member 2413. When the touch force is over a threshold value, the actuator 23 can be activated.

Figure 6:
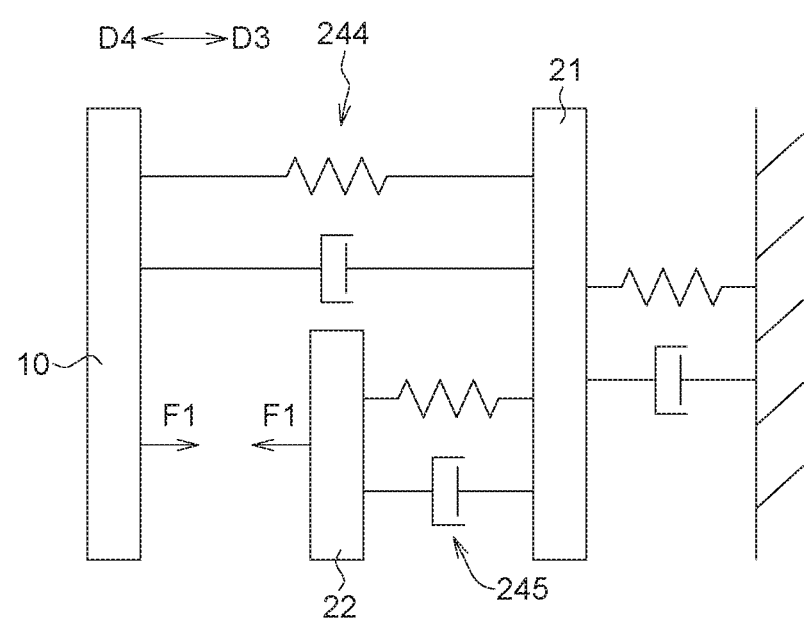
FIG. 6 schematically illustrates the electronic device of FIG. 4.

FIG. 6 schematically illustrates the electronic device 2 of FIG. 4. In FIG. 6, a mass-spring-damper system is used for describing. Referring to FIGS. 4-6, when the actuator 23 is activated, the first component 231 and the second component 232 of the actuator 23 exerts a mechanical force to the touch panel 10 and to the counter mass 22, such that the touch panel 10 and the counter mass 22 move in opposite directions. For example, the touch panel 10 is subjected to a force F1 from the first component 231 of the actuator 23 in direction D3, and the counter mass 22 is subjected to a force F1 from the second component 232 of the actuator 23 in direction D4; meanwhile, the first elastic member 244 and the second elastic member 245 store elastic potential energy, Once the forces F1 applied to the touch panel 10 and to the counter mass 22 are released, the touch panel 10 starts to vibrate due to the elastic potential energy stored in the first elastic member 244, thereby generating haptic feedback to the user. The vibration or movement of the touch panel 10 is in a direction horizontal to the touch surface 101, that is, horizontal to the x-y plane. For example, direction D3 or D4. Thus, the movement is called horizontal (or lateral) haptic movement. Meanwhile, the counter mass 22 starts to vibrate as well due to the elastic potential energy stored in the second elastic member 245 so as to compensate or counteract vibration of the touch panel 10. Similarly, the vibration or movement of the counter mass 22 is in a direction horizontal to the touch surface 101, that is, horizontal to the x-y plane. For example, in direction D3 or D4. That is, during one vibration period, the counter mass 22 moves in a direction (e.g., direction D3) that is opposite to the direction (e.g., direction D4) which the touch panel 10 moves in. According to some embodiments, the ratio of the weight of the touch panel 10 to the stiffness of the first elastic member 244 may be adjusted according to requirements, for example, may be adjusted to be substantially equal to the ratio of the weight of the counter mass 22 to the stiffness of the second elastic member 245. Therefore, the housing 21 is free from vibration.

Figure 7A:
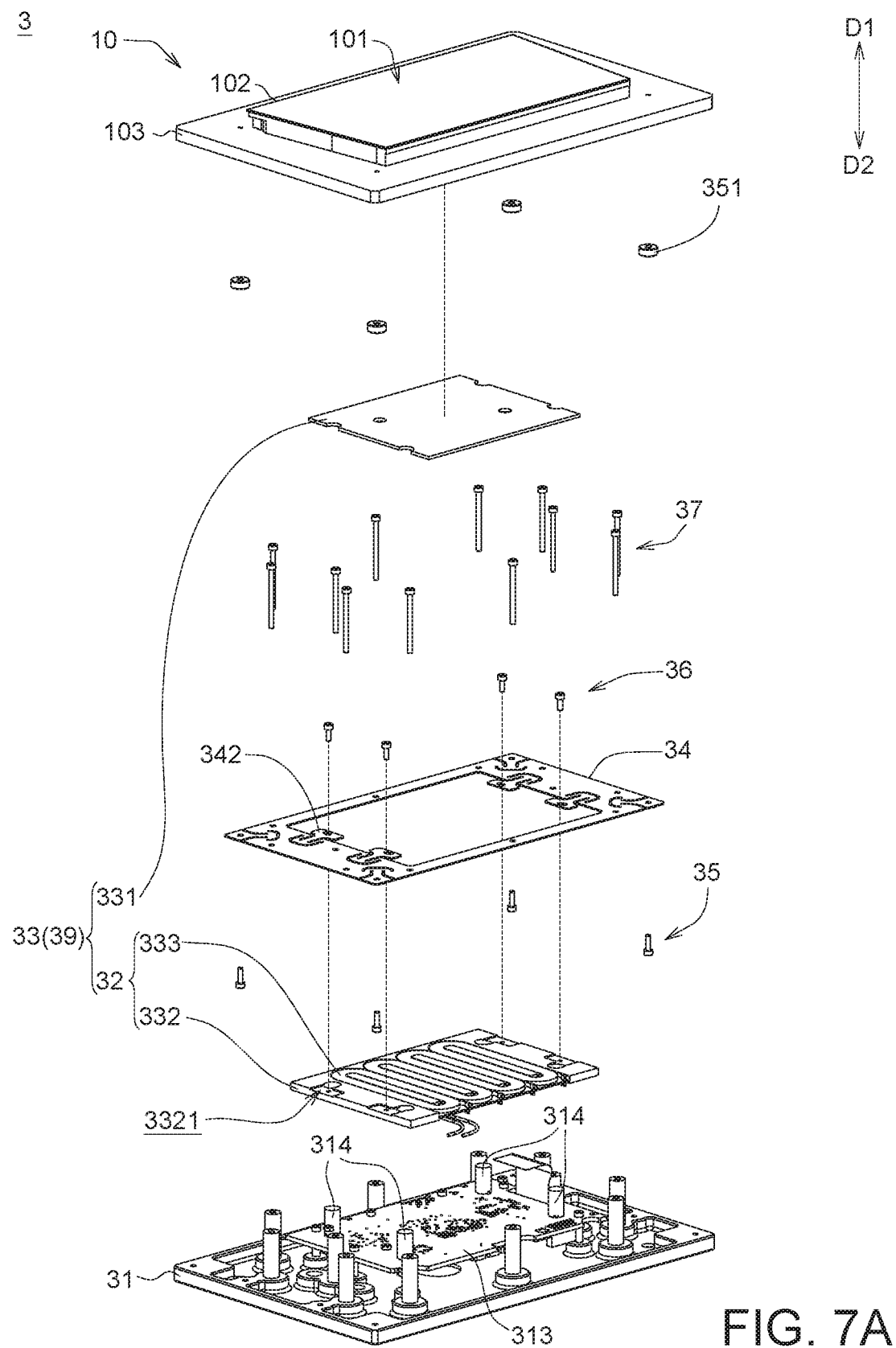
FIG. 7A shows an exploded view of an electronic device according to still another embodiment of the present disclosure.
Figure 7B:
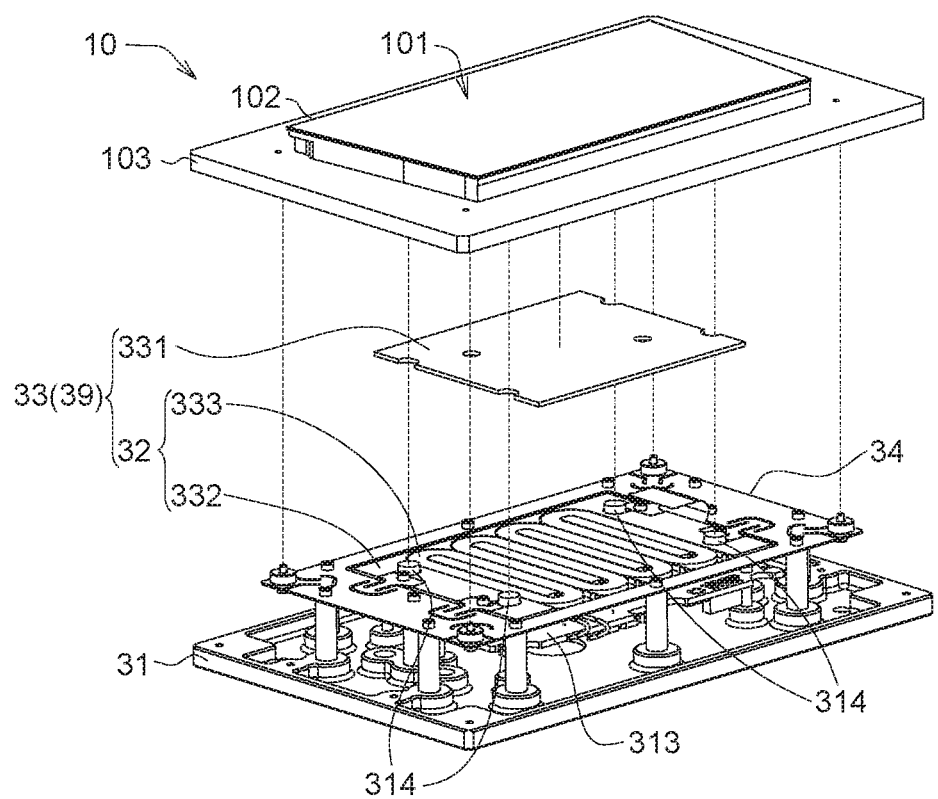
FIG. 7B shows a partially exploded view of the electronic device of FIG. 7A.

FIG. 7A shows an exploded view of an electronic device 3 according to still another embodiment of the present disclosure. FIG. 7B shows a partially exploded view of the electronic device 3 of FIG. 7A. The elements in the present embodiment sharing similar or the same labels with those in the previous embodiments are similar or the same elements, and the description of which is omitted. The electronic device 3 as shown in the present embodiment is different from the electronic devices 1 and 2 in the previous embodiments mainly in the design of the housing 31, the moving element 39 and the elastic plate 34.

Still referring to FIGS. 7A and 7B, the electronic device 3 may further include a printed circuit board (PCB) 313 and a force sensor 314. The touch panel 10 can include a panel element 102 and a bottom element 103 disposed under the panel element 102. The PCB 313 may be disposed on the housing 31. The force sensor 314, which may exemplarily include four sensor pillars, may be connected to the bottom element 103 of the touch panel 10. The bottom element 103 may be a backlight unit, a supporting substrate, and the like. When a user touches the touch surface 101, the touch panel 10 may provide vertically dynamic vibration or movement to the user.

In the present embodiment, the moving element 39 may be an actuator 33 itself, and part of the actuator 33 may also serve as the counter mass 32 with the similar function of the above-mentioned counter masses 12 and 22. Thus, the overall thickness of the electronic device 3 may be thinner, and there is no need to add an additional counter weight. That part of the actuator 33 which may serve as the counter mass 32 may be configured to compensate or counteract vibration of the touch panel 10, such that the vibration will not be transmitted to the housing 31.

Figure 8A:
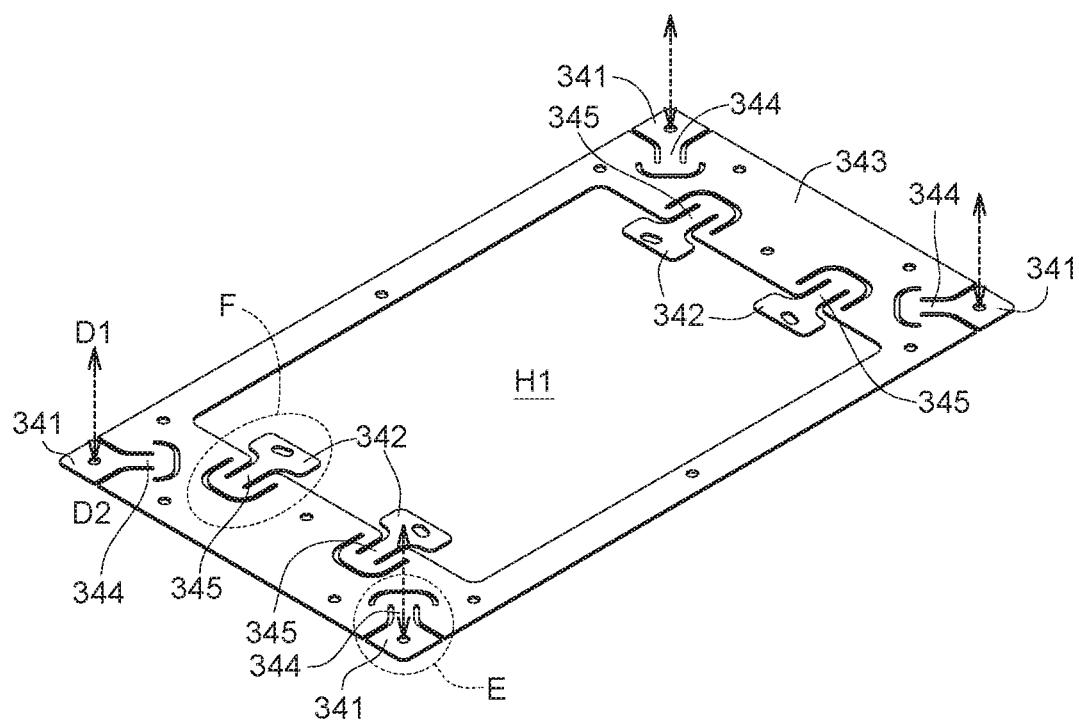
FIG. 8A shows a schematic view of an elastic plate of the electronic device of FIG. 7A.

FIG. 8A shows a schematic view of the elastic plate 34 of the electronic device 3 of FIG. 7A. As shown in FIG. 8A, the elastic plate 34 may include a first portion 341, a second portion 342 and a third portion 343. The first portion 341 can be connected to the touch panel 10, the second portion 342 can be connected to the moving element 39, and the third portion 343 can be connected to the housing 31. In one embodiment, there may be four first portions 341 at corners of the elastic plate 34. The elastic plate 34 may have a hollow portion H1 in the middle region. The third portion 343 may be located in the peripheral region of the elastic plate 34, and the hollow portion H1 may be surrounded by the third portion 343. The second portion 342 is connected to the third portion 343. In addition, the second portion 342 can be disposed between the third portion 343 and the hollow portion H1, and extend toward the hollow portion H1, In one embodiment, there may be four second portions 342. The elastic plate 34 may be symmetrical. However, the present disclosure is not limited thereto.

Figure 8B:
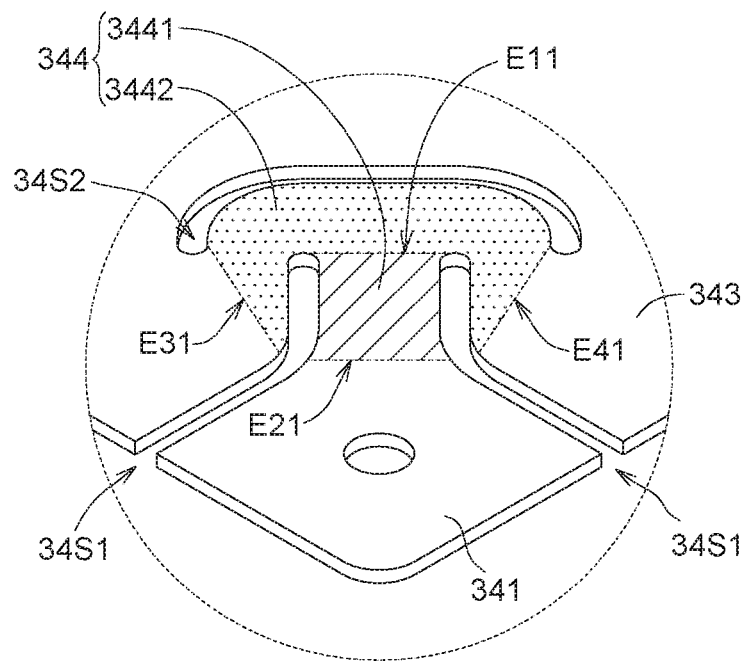
FIG. 8B shows a partially enlarged view of region E of the elastic plate of FIG. 8A.

FIG. 8B shows a partially enlarged view of region E of the elastic plate 34 of FIG. 8A. Referring to FIG. 8A and FIG. 8B, the elastic plate 34 may further include a first elastic member 344 connected between the first portion 341 and the third portion 343, and a second elastic member 345 connected between the second portion 342 and the third portion 343. According to some embodiments, the first portion 341, the third portion 343 and the first elastic member 344 may be disposed in the same plane. According to some embodiments, the second portion 342, the third portion 343 and the second elastic member 345 may be disposed in the same plane. The first portion 341 may move relative to the third portion 343 with one degree of freedom (i.e., the movement in z-axis) via the first elastic member 344 without rotation. Specifically, as shown in FIG. 8B, the first elastic member 344 may include a first linear portion 3441 and a first U-shaped portion 3442 connected to one end E11 of the first linear portion 3441. The first elastic member 344 may be connected to the first portion 341 at the other end E21 of the first linear portion 3441. The first elastic member 344 may be connected to the third portion 343 at two ends E31 and E41 of the first U-shaped portion 3442.

Furthermore, the elastic plate 34 may have two first slots 3451 and a first separating slot 3452. As shown in FIG. 8B, the two first slots 3451 may separate the first portion 341 from the third portion 343, and may further separate the first linear portion 3441 from the first U-shaped portion 3442 except for the end E11. The first separating slot 3452 may separate the first elastic member 344 from the third portion 343, and specifically, separate the first U-shaped portion 3442 from the third portion 343 except for the two ends E31 and E41. When the first portion 341 moves, the first linear portion 3441 and the first U-shaped portion 3442 may both deform, and thus the first portion 341 may move relative to the third portion 343 with one degree of freedom (i.e., the movement in z-axis) without rotation.

Figure 8C:
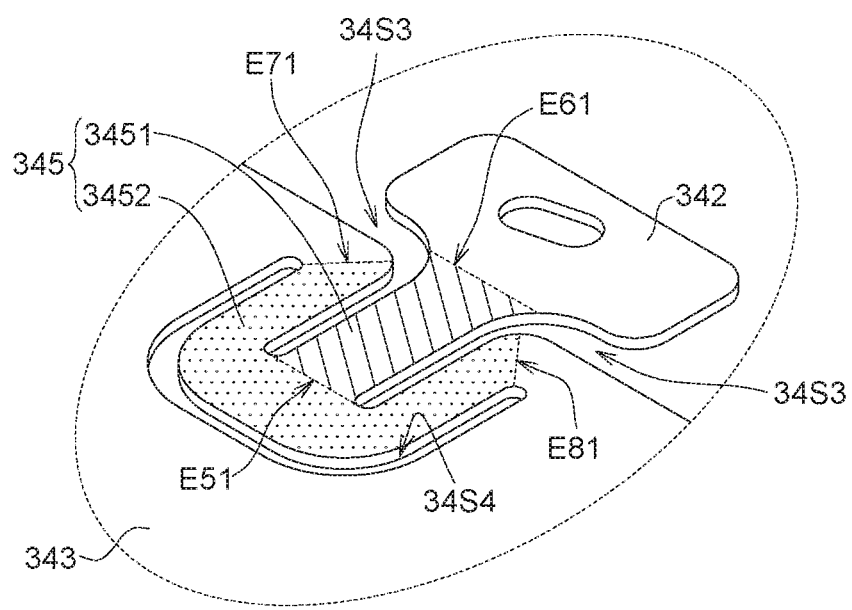
FIG. 8C shows a partially enlarged view of region F of the elastic plate of FIG. 8A.

FIG. 8C shows a partially enlarged view of region F of the elastic plate 34 of FIG. 8A. Referring to FIG. 8A and FIG.

8C, similarly, the second portion 342 may move relative to the third portion 343 with one degree of freedom (i.e., the movement in z-axis) via the second elastic member 345 without rotation, Specifically, as shown in FIG. 8C, the second elastic member 345 may include a second linear portion 3451 and a second U-shaped portion 3452 connected to one end E51 of the second linear portion 3451, The second elastic member 345 may be connected to the second portion 342 at the other end E61 of the second linear portion 3451. The second elastic member 345 may be connected to the third portion 343 at two ends E71 and E81 of the second U-shaped portion 3452.

Furthermore, the elastic plate 34 may have two second slots 34S3 and a second separating slot 34S4. As shown in FIG. 8C, the two second slots 34S3 may separate the third portion 343 from the second portion 342, and may further separate the second linear portion 3451 from the second U-shaped portion 3452 except for the end E51. The second separating slot 34S4 may separate the second elastic member 345 from the third portion 343, and specifically, separate the second U-shaped portion 3452 from the third portion 343 except for the two ends E71 and E81. When the second portion 342 moves, the second linear portion 3451 and the second U-shaped portion 3452 may both deform, and thus the second portion 342 may move relative to the third portion 343 with one degree of freedom (i.e., the movement in z-axis) without rotation.

Here in FIG. 8A, the first elastic member 344 may include four leaf springs each for connecting one first portion 341 and the third portion 343, and the second elastic member 345 may include four leaf springs each for connecting one second portion 342 and the third portion 343. However, the present disclosure is not limited thereto.

According to the above arrangement for the elastic plate 34 of FIG. 8A, the first portion 341, the second portion 342, the third portion 343, the first elastic member 344 and the second elastic member 345 are substantially coplanar (i.e., in the same plane parallel to x-y plane), thereby reducing the overall thickness of the electronic device 3, In some embodiments, the first portion 341, the second portion 342, the third portion 343, the first elastic member 344 and the second elastic member 345 may be integrally formed into the same elastic plate. In addition, the elastic plate 34 may allow one degree of freedom of vibration for the touch panel 10 and for the counter mass 32.

Referring to FIG. 7A, FIG. 7B and FIG. 8A, the first portion 341 is connected to the touch panel 10, for example, connected to the backlight unit (not shown) of the touch panel 10, by a fixing element 35. In one embodiment, the fixing element 35 may exemplarily include four sets of screw and washer 351 each set for joining one first portion 341 to the touch panel 10, so that the touch panel 10 is allowed to move relative to the housing 31 with one degree of freedom (i.e., in directions D1 and D2 parallel to z-axis) via the first elastic member 344.

Figure 9A:
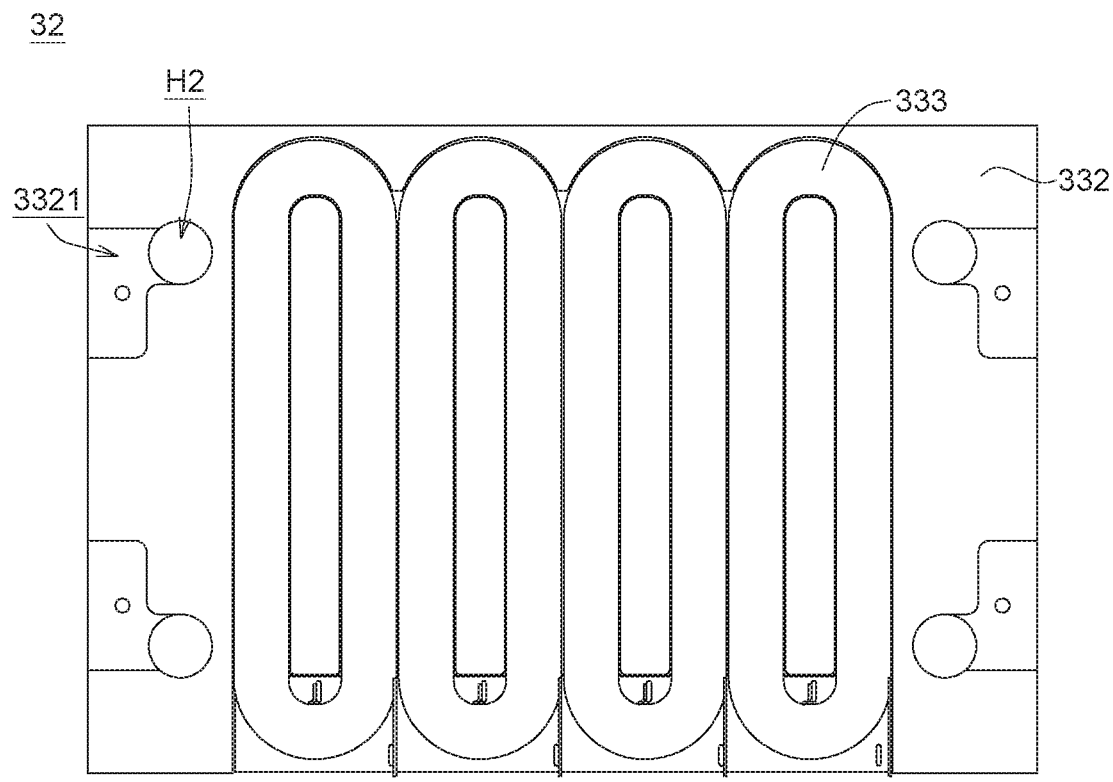
FIG. 9A shows a top view of part of the actuator of the electronic device of FIG. 7A.

FIG. 9A shows a top view of part of the actuator 33 of the electronic device 3 of FIG. 7A. Referring to FIG. 7A and FIG. 9A, the actuator 33 may include a first component 331, a second component 332 and a coil 333 disposed on the second component 332. Referring to FIG. 9A, the part of the actuator 33, namely the second component 332 and the coil 333, may serve as the counter mass 32 with the similar function of the counter mass 12 and 22 of FIG. 1 and FIG. 4.

The second portion 342 of the elastic plate 34 is connected to the moving element 39. In the present embodiment, as shown in FIG. 7A, FIG. 8A and FIG. 9A, the second portion 342 may be connected to the part of the actuator 33, which may serve as the counter mass 32 (i.e., the second component 332 and the coil 333). In addition, the other part of the actuator 33 (i.e., the first component 331) may be connected to the touch panel 10. Specifically, the second portion 342 may be connected to the second component 332 of the actuator 33. For example, the second component 332 of the actuator 33 may have a recess 3321 for receiving the second portion 342 of the elastic plate 34, as shown in FIGS. 7A and 9A. The second portion 342 may be connected to the second component 332 by a fixing element 36. In one embodiment, the fixing element 36 may exemplarily include four screws each for joining one second portion 342 to the recess 3321 of the second component 332. The second component 332 can be located correspondingly to the hollow portion H1 of the elastic plate 34. Referring to FIG. 7A, by disposing the second portion 342 of the elastic plate 34 to be received in the recess 3321 of the second component 332, the top surface of the second component 332 and the top surface of the elastic plate 34 can be coplanar, thus reducing the overall thickness of the electronic device 3. Therefore, the second component 332 and the coil 333 disposed thereon (together serve as the counter mass 32) are allowed to move relative to the housing 31 with one degree of freedom (i.e., in directions D1 and D2 parallel to z-axis) via the second elastic member 345.

The third portion 343 is connected to the housing 31 by a fixing element 37. In one embodiment, the fixing element 37 may exemplarily include a plurality of screws for joining the third portion 343 to the housing 31. In some embodiments, when vibrations of the touch panel 10 and the counter mass 32 occur, the vibrations would not be transmitted to the housing 31.

The moving element 39 is connected to the touch panel 10. In the present embodiment, the first component 331 of the actuator 33 may be connected to the touch panel 10, for example, by glue. As shown in FIG. 7B, the first component 331 of the actuator 33 may be disposed between the touch panel 10 and the counter mass 32.

Figure 9B:
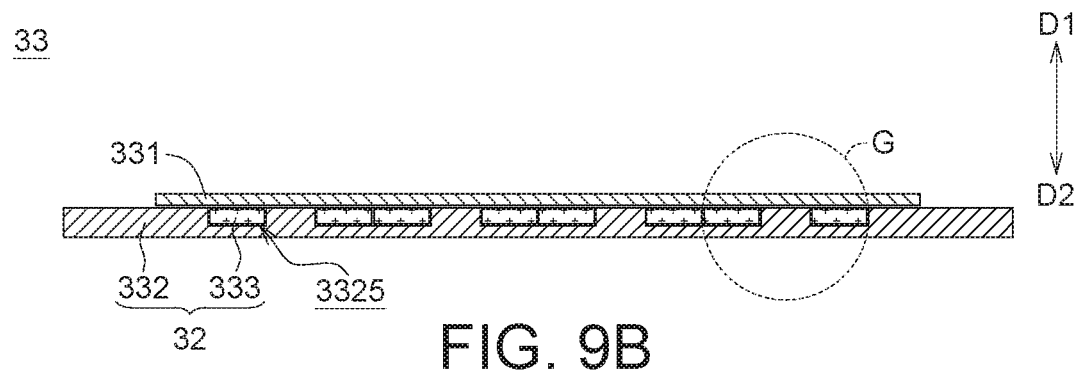
FIG. 9B shows a cross-sectional view of the actuator of the electronic device of FIG. 7A.

Referring to FIG. 9B, a cross-sectional view of the actuator 33 of the electronic device 3 of FIG. 7A is shown. The actuator 33 may be an electromagnetic actuator. The first component 331 may be a yoke made of iron material, and the second component 332 may be a stator made of iron material. The second component 332 can include a plurality of recesses 3325, in which the coil 333 can be received. Referring to FIG. 7B, FIG. 9A and FIG. 9B, the second component 332 may further have a hole H2, wherein the force sensor 314 may penetrate through the hole H2 to be connected to the bottom element 103 of the touch panel 10. When the user touches the touch surface 101, the force sensor 314 may measure a distance to the force sensor coil printed in the PCB 313 by inductance. The distance is then converted to a touch force to the touch panel 10 in directions D1 and D2. When the touch force is over a threshold value, the PCB 313 may apply a current flow running through the coil 333 to activate the actuator 33. Accordingly, an electromagnetic field may be generated between the first component 331 and the second component 332, thereby producing an attracting force between the first component 331 and the second component 332.

Figure 9C:
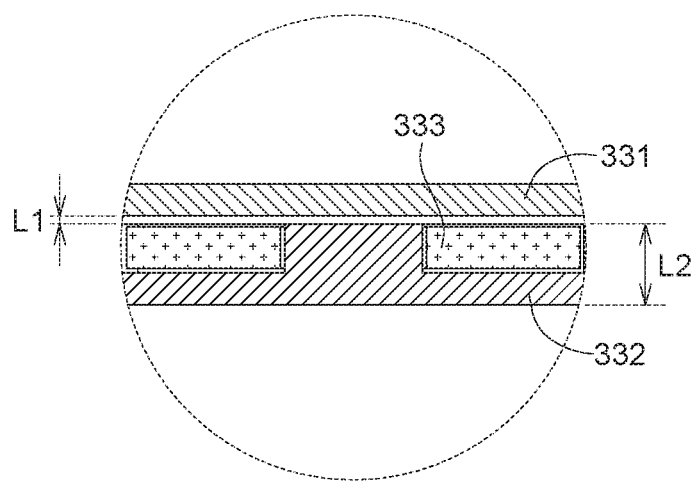
FIG. 9C shows a partially enlarged view of region G of the actuator of FIG. 9B.

Referring to FIG. 9C, a partially enlarged view of region G of the actuator 33 of FIG. 9B is shown. In one embodiment, the gap L1 between the first component 331 and the second component 332 may be 0.5 mm≤L1≤2 mm. In one embodiment, the thickness L2 of the counter mass 32 may be L2≤5 mm. However, the present disclosure is not limited thereto.

Figure 10:
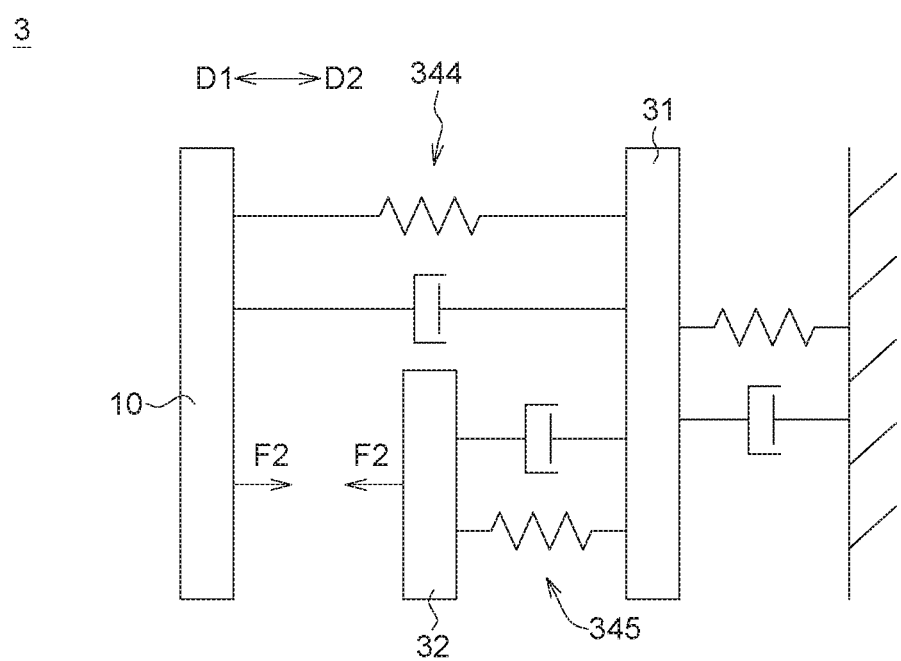
FIG. 10 schematically illustrates the electronic device of FIG. 7A.

FIG. 10 schematically illustrates the electronic device 3 of FIG. 7A. In FIG. 10, a mass-spring-damper system is used for describing. Referring to FIGS. 7A-10, when the actuator 33 is activated, an attracting force may be generated between the first component 331 and the second component 332, thus moving the touch panel 10 downwards and moving the counter mass 32 upwards, such that the touch panel 10 and the counter mass 32 move in opposite directions. For example, the touch panel 10 is subjected to a force F2 from the first component 331 of the actuator 33 in direction D2, and the counter mass 32 is subjected to a force F2 in direction D1; meanwhile, the first elastic member 344 and the second elastic member 345 store elastic potential energy. Once the forces F2 applied to the touch panel 10 and to the counter mass 32 are released, the touch panel 10 starts to vibrate due to the elastic potential energy stored in the first elastic member 344, thereby generating haptic feedback to the user. The vibration or movement of the touch panel 10 is in a direction vertical to the touch surface 101 of the touch panel 10, that is, in z-axis direction. Thus, the movement is called vertical haptic movement. Meanwhile, the counter mass 32 starts to vibrate as well due to the elastic potential energy stored in the second elastic member 345 so as to compensate or counteract vibration of the touch panel 10. Similarly, the vibration or movement of the counter mass 32 is in z-axis direction. That is, during one vibration period, the counter mass 32 moves in a direction (e.g., direction D1) that is opposite to the direction (e.g., direction D2) which the touch panel 10 moves in. According to some embodiments, the ratio of the weight of the touch panel 10 to the stiffness of the first elastic member 344 may be adjusted according to requirements, for example, may be adjusted to be substantially equal to the ratio of the weight of the counter mass 32 to the stiffness of the second elastic member 345. Therefore, the housing 31 is free from vibration.

According to some embodiments, the electronic device includes a touch panel, a housing, a moving element, and an elastic plate. The elastic plate includes a first portion connected to the touch panel, a second portion connected to the moving element, and a third portion connected to the housing. In some embodiments, the moving element may include an actuator and a counter mass configured to compensate or counteract vibration of the touch panel, such that the vibration will not be transmitted to the housing. In some embodiments, the moving element may be an actuator itself, and a part of the actuator may serve as a counter mass configured to compensate or counteract vibration of the touch panel, such that the vibration will not be transmitted to the housing.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An electronic device comprising:
   a touch panel;
   a housing;
   an actuator connected to the touch panel and comprising a first component and a second component; and
   an elastic plate having a hollow portion and comprising a first portion connected to the touch panel, a second portion connected to the actuator, and a third portion connected to the housing;
   wherein the second component is located correspondingly in the hollow portion of the elastic plate, the first component is disposed between the touch panel and the second component, and a gap is between the first component and the second component.

2. The electronic device according to claim 1, wherein the elastic plate further comprises a first elastic member connected between the first portion and the third portion, and a second elastic member connected between the second portion and the third portion.

3. The electronic device according to claim 2, wherein the first elastic member and the second elastic member are formed of leaf springs.

4. The electronic device according to claim 1, wherein the actuator is an electromagnetic actuator.

5. The electronic device according to claim 1, wherein the first component is connected to the touch panel.

6. The electronic device according to claim 1, wherein the second portion of the elastic plate is connected to the second component.

7. The electronic device according to claim 6, wherein the second component of the actuator has a recess for receiving the second portion of the elastic plate.

8. The electronic device according to claim 1, wherein the hollow portion is surrounded by the third portion.

* * * * *